United States Patent [19]

Johnson

[11] 4,020,717
[45] May 3, 1977

[54] CONTROLLING ROTARY MECHANISMS
[75] Inventor: Neville Robert Johnson, Port Elizabeth, South Africa
[73] Assignee: Bus Bodies (S.A.) Limited, Port Elizabeth, South Africa
[22] Filed: Aug. 28, 1975
[21] Appl. No.: 608,654
[30] Foreign Application Priority Data
Sept. 18, 1974 South Africa ............. 74/5939
[52] U.S. Cl. .................. 74/804; 297/362
[51] Int. Cl.² ............... F16H 1/28; B60N 1/02
[58] Field of Search ........... 74/804, 805; 297/361, 297/362

[56] References Cited
UNITED STATES PATENTS

| 3,401,979 | 9/1968 | Putsch | 297/362 |
| 3,667,804 | 6/1972 | Yasui et al. | 297/362 |
| 3,673,891 | 7/1972 | Pickles | 74/804 |
| 3,807,797 | 4/1974 | Klingelhofer | 297/362 |
| 3,833,965 | 9/1974 | Hess | 297/362 X |

FOREIGN PATENTS OR APPLICATIONS

| 1,555,711 | 10/1969 | Germany | 297/362 |
| 1,237,796 | 6/1971 | United Kingdom | 74/804 |

Primary Examiner—Samuel Scott
Assistant Examiner—Lance W. Chandler
Attorney, Agent, or Firm—Harness, Dickey & Pierce

[57] ABSTRACT

A rotary mechanism having two members, the relative rotary positions of which are to be controlled, the mechanism including:
  a rotatable drive shaft on which the two members are co-axially mounted;
  an eccentric fixed to the drive shaft;
  an internally toothed ring gear on one of the two members and co-axial with the drive shaft;
  an externally toothed pinion on the other of the two members and co-axial with the drive shaft; and
  an intermediate gear rotatably mounted on the eccentric and having external teeth in mesh with the ring gear and internal teeth in mesh with the pinion, the internal and external teeth on the intermediate gear being selected to permit an eccentric movement of the intermediate gear about the pinion and within the ring gear thereby to cause a driving inter-action between the two members upon rotation of the drive shaft.

6 Claims, 9 Drawing Figures

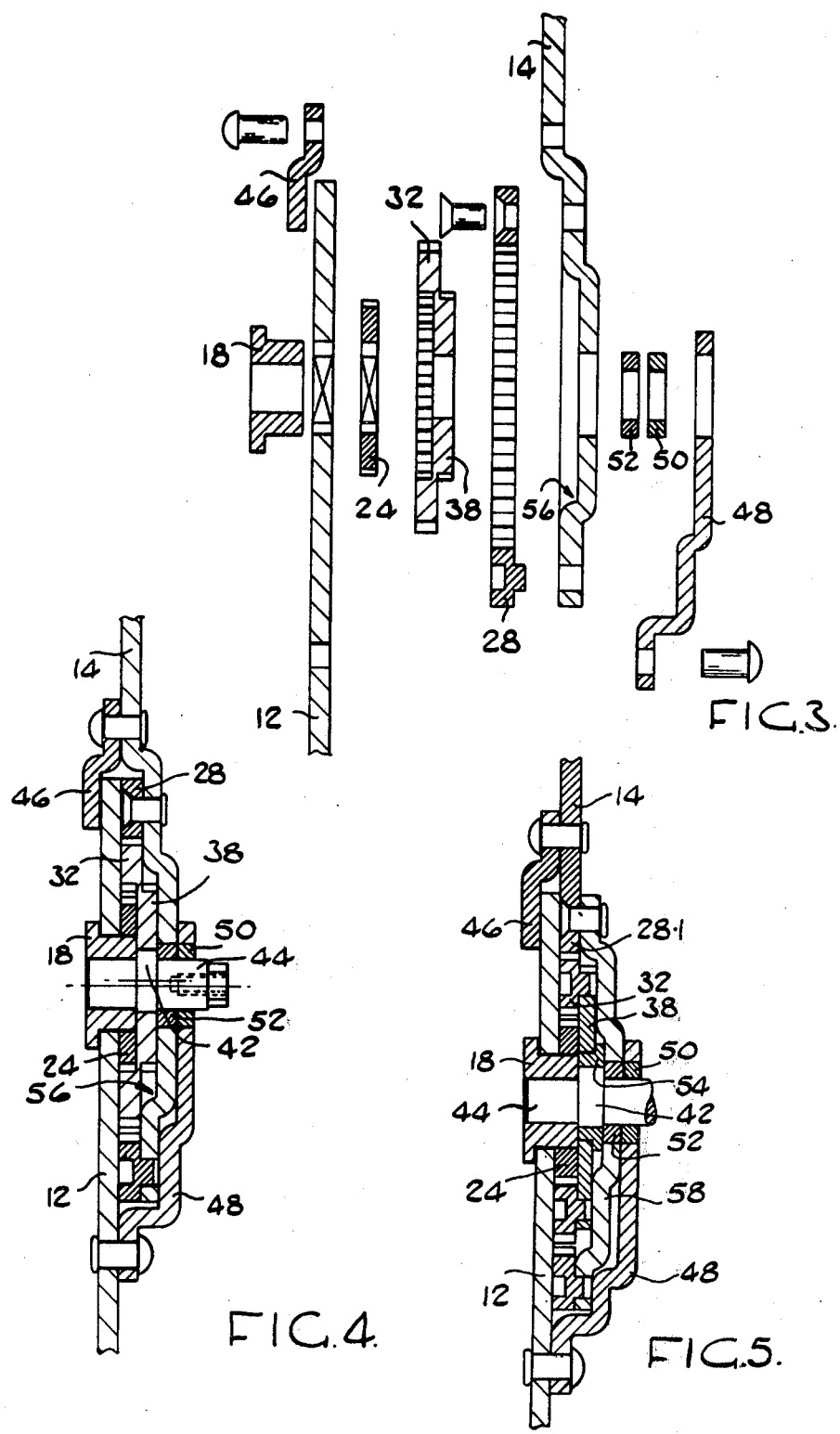

CONTROLLING ROTARY MECHANISMS

This invention relates to controlling rotary mechanisms. It relates in particular to the controlling of the relative rotary positions of two members. In application, the two members can be fitted to a seat, e.g. in a motor vehicle, and whereby the rake of the backrest can be adjusted; or the two members can be fitted to control the operation of a window winder mechanism, e.g. in a vehicle; or the like.

According to the invention there is provided a rotary mechanism having two members, the relative rotary positions of which are to be controlled, the mechanism including:

a rotatable drive shaft on which the two members are co-axially mounted;

an eccentric fixed to the drive shaft;

an internally toothed ring gear on one of the two members and co-axial with the drive shaft;

an externally toothed pinion on the other of the two members and co-axial with the drive shaft; and an intermediate gear rotatably mounted on the eccentric and having external teeth in mesh with the ring gear and internal teeth in mesh with the pinion, the internal and external teeth on the intermediate gear being selected to permit an eccentric movement of the intermediate gear about the pinion and within the ring gear thereby to cause a driving inter-action between the two members upon rotation of the drive shaft.

Further in accordance with the invention a method of controlling the relative rotary positions of two members includes:

mounting the two members co-axially on a rotatable drive shaft having an eccentric fixed thereto;

providing an internally toothed ring gear on one of the members and an externally toothed pinion on the other of the two members; and mounting on the eccentric an intermediate gear having external teeth in mesh with the ring gear and internal teeth in mesh with the pinion, the internal and external teeth on the intermediate gear being selected to permit an eccentric movement of the intermediate gear about the pinion and within the ring gear thereby to cause a driving inter-action between the two members upon rotation of the drive shaft.

The external teeth on the intermediate gear conveniently mesh with the teeth on the ring gear at a position diametrically opposite to the meshing of the internal teeth on the intermediate gear with the teeth of the pinion.

The internal and external teeth on the intermediate gear are conveniently selected so that there are less external teeth on the intermediate gear than on the ring gear and there are a corresponding number of teeth less on the pinion than on the internal teeth of the intermediate gear.

The two members may be mounted on the drive shaft via bushes. The bush on one member may be fixed to one of the two members and the pinion may be fixed on the bush thereby to fix it relative to that member.

The ring gear and/or the pinion may be integrally formed on the respective members. In another embodiment, the ring gear, and if desired also the pinion, may be fixed to the respective members by rivets, studs, or the like.

A bearing plate may be provided intermediate the intermediate gear and the eccentric. If required a bush may also be provided between the bearing plate and the eccentric.

The intermediate gear may be integral with the bearing plate, or it may be attached thereto, e.g. by studs or the like.

The drive shaft may have a hand wheel attached thereto for rotating the drive shaft. Drive between the handwheel and drive shaft may be effected by frictional engagement or it could be a direct drive, e.g. by splines, a key and keyway, or the like.

A friction pad may also be provided intermediate the hand wheel and a braking surface, e.g. provided on one of the two members. This serves as a brake for the hand wheel to prevent it rotating of its own accord, e.g. caused by vibrations transmitted to the mechanism.

Various embodiments of the invention are now described by way of example with reference to the accompanying drawings, in which:

FIG. 3 shows an exploded cross sectional view of a further form of the mechanism;

FIG. 4 shows a cross sectional assembled view of the mechanism shown in FIG. 3;

FIG. 5 shows a cross sectional assembled view of a further embodiment of the mechanism;

Figure 1:
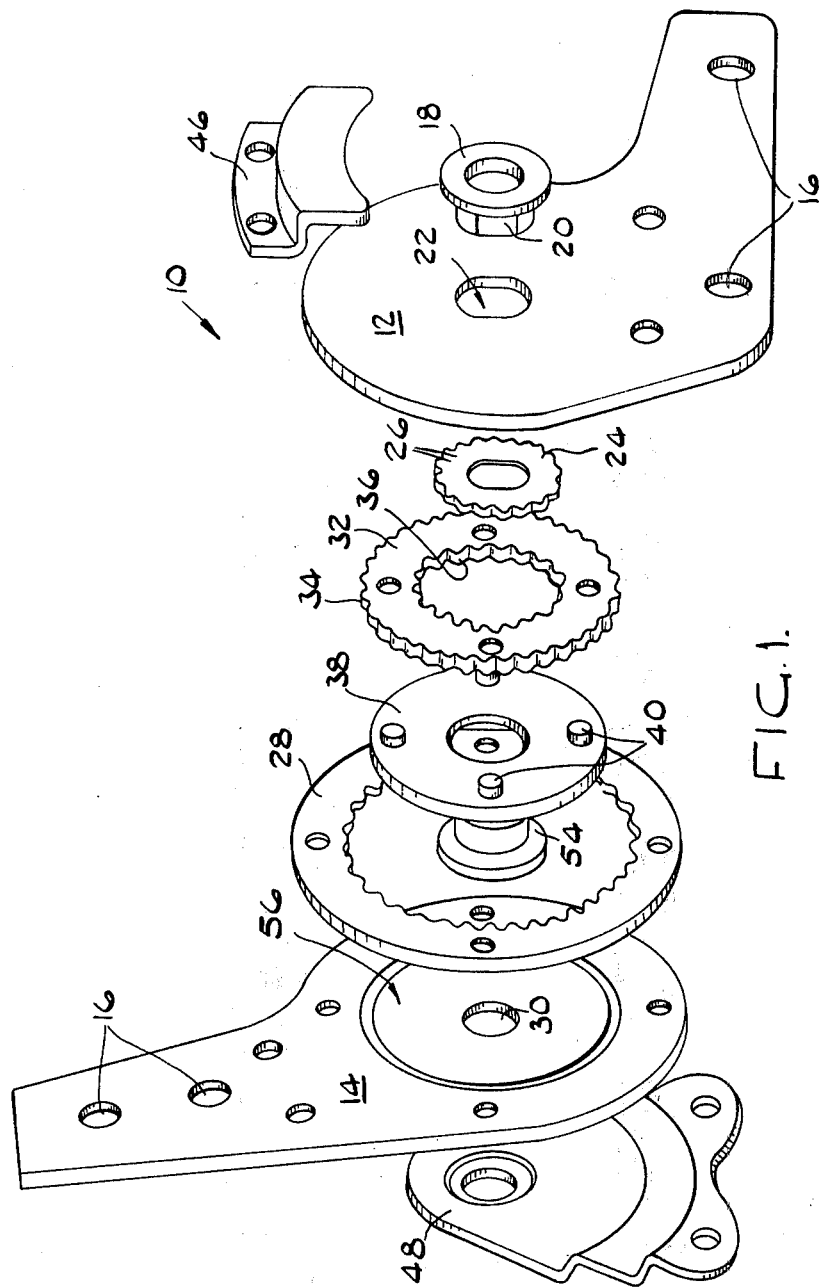
FIG. 1 shows an exploded three dimensional view of the main components of the mechanism but without the drive shaft.

Referring to FIG. 1, reference numeral 10 generally indicates a rotary mechanism in this embodiment particularly intended for use as a seat recliner mechanism for adjusting the rake of the backrest of a seat. The mechanism includes two members 12 and 14 in the form of a lower hinge arm and a upper hinge arm respectively. The lower hinge arm 12 can be fixed to the base of the seat and the upper hinge arm 14 to the backrest of the seat via apertures 16.

Figure 8:
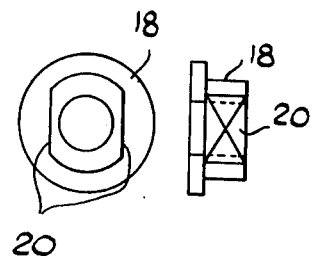
FIG. 8 shows a front and side elevation of a bush locator used in the mechanism.

A bush 18, which, as shown more clearly in FIG. 8, has a pair of opposed flats 20, is located in the lower hinge arm 12 in a correspondingly shaped aperture 22. An externally toothed pinion 24 also having correspondingly shaped flats 26 is located on the bush 18 and thereby fixed relative to the lower hinge arm 12.

A ring gear 28 is located on the upper hinge arm 14 by riveting so that it is co-axial with a drive shaft which fits into an aperture 30 in the upper hinge arm 14.

An intermediate gear 32 having external teeth 34 and internal teeth 36 is mounted on a bearing plate 38 by means of studs 40. The bearing plate 38 is mounted on an eccentric 42 provided on a drive shaft 44 (see FIG. 4).

Figure 2:
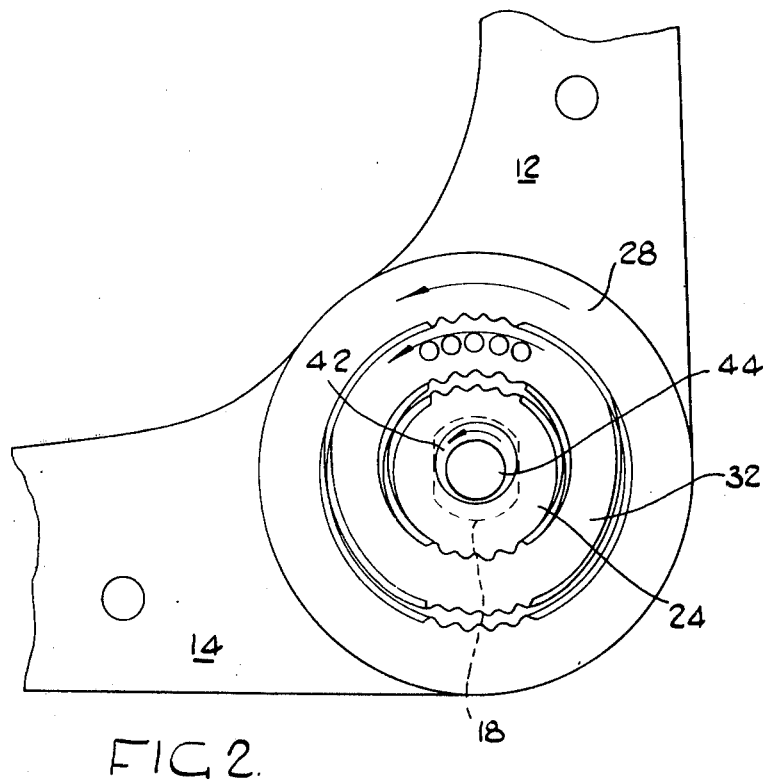
FIG. 2 shows a side elevation of the two members and the meshing between the ring gear, intermediate gear, and pinion.

As shown more clearly in FIG. 2, the external teeth on the intermediate gear 32 are in mesh with the ring gear 28 at a position diametrically opposite to the meshing of the internal teeth on the intermediate gear 32 with the pinion 24.

As shown more clearly in FIG. 4, the mechanism is held together by an upper retaining plate 46 riveted to the upper hinge arm 14 and by a lower retaining plate 48 riveted to the lower hinge arm 12. The lower retaining plate 48 relieves loads placed on the drive shaft 42 and supports it via a bush 50. The upper hinge arm 14 is also supported on the drive shaft 44 by means of a bush 52.

In the FIG. 1 embodiment, bearing plate 38 has a bush 54 intermediate it and the eccentric 42. In order to accomodate the bearing plate 38 and bush 54, the upper hinge arm 14 is recessed as shown in FIG. 1 at 56.

Figure 9:
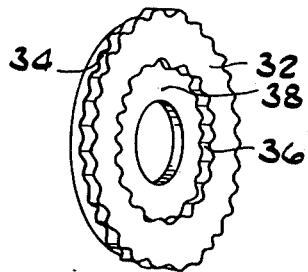
FIG. 9 shows a three dimensional view of one form of the intermediate gear used in the mechanism.

In the FIGS. 3 and 4 embodiment, instead of the intermediate gear 32 being fixed by studs to the bearing plate 38, it is integral with the bearing plate 38 as shown also in FIG. 9.

In the FIG. 5 embodiment, instead of the ring gear 28 being separable from the upper hinge arm 14, it is integrally formed therewith at 28.1. The intermediate gear 32 and bearing plate 38 are again however separate as in the FIG. 1 embodiment. The bearing plate 38 and bush 54 are then accommodated in a recess formed by a retaining plate 58 fixed to the upper hinge arm 14.

Figure 6:
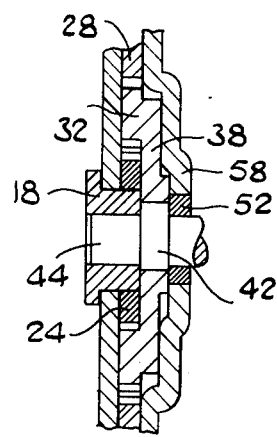
FIG. 6 shows a cross sectional assembled view of portion of yet a further embodiment of the mechanism.

The FIG. 6 embodiment is somewhat similar to the FIG. 5 embodiment except that the intermediate gear 32 is cast or forged integrally with the bearing plate 38 in a slightly modified form to that shown in FIGS. 3 and 4.

Figure 7:
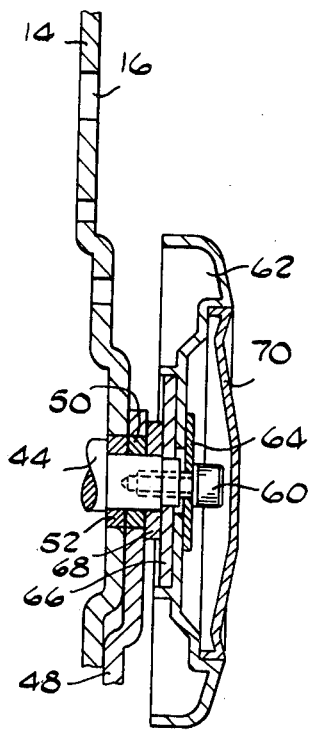
FIG. 7 shows a cross sectional view of portion of the mechanism indicating particularly how the drive shaft is driven in one embodiment of the invention.

Referring now to FIG. 7, one means of driving the drive shaft 44 is shown. A screw 60 fixes a hand wheel 62 onto the drive shaft 44 by means of a washer 64. The screw 60 is covered by a cover 70 which is a resilient interference fit within the hand wheel 62. A drive plate 66 is fitted in a recess on the inner end of the hand wheel 62. The drive plate 66 has projections (not shown) on its periphery whereby it is fixed relative to the hand wheel 62 and has flats in a central aperture whereby it drivingly engages the drive shaft 44. The drive plate 66 frictionally engages with a friction pad 68 which serves to brake the hand wheel to prevent it rotating e.g. as a result of vibrations transmitted to the mechanism.

In use, the lower hinge arm 14 is non-rotatably fixed to the base of a seat and the upper hinge arm 12 is fixed to the backrest of the seat. Rotation of the hand wheel 62 will cause the intermediate gear to rotate eccentrically about the fixed pinion 24 and within the ring gear 28 as shown by the arrows in FIG. 2. A driving inter-action results so that the backrest of the seat can be adjusted to any desired position relative to the base of the seat.

The mechanism can also be applied for example as a window winder mechanism. In such an application, the one member 14 can be fixed for example in the door panel of a motor vehicle, and the other member 12 would be attached to the lift arm of the window raising mechanism. Rotation of the drive shaft 44 e.g. by a window winder handle, would therefore cause displacement of the member 12 relative to the member 14 to raise or lower the window raising mechanism.

It is an advantage of this invention that accurate control of the relative rotary positions of two members can be effected. The ratio of movement will be determined by the gear ratio of the gear train comprising the ring gear 28, the intermediate gear 32 and the fixed pinion 24. Because of the use of three gears in the gear train, the one member 12 can be mounted co-axially with the member 14 and does not have to move eccentrically as in some prior seat recliner mechanisms. In the instant invention, a relatively fast speed of rotation can be achieved while still allowing the member 12 to pivot co-axially with the drive shaft and with the member 14.

I claim:

1. A rotary mechanism having two members, the relative rotary positions of which are to be controlled, the mechanism including:
    a rotatable drive shaft on which the two members are co-axially mounted;
    an eccentric fixed to the drive shaft;
    an internally toothed ring gear on one of the two members and co-axial with the drive shaft;
    an externally toothed pinion on the other of the two members and co-axial with the drive shaft; and
    an intermediate gear rotatably mounted on the eccentric and having external teeth in mesh with the ring gear and internal teeth in mesh with the pinion, the internal and external teeth on the intermediate gear being selected to permit an eccentric movement of the intermediate gear about the pinion and within the ring gear thereby to cause a driving inter-action between the two members upon rotation of the drive shaft.

2. A rotary mechanism as claimed in claim 1, in which the ring gear or the pinion are integrally formed on the respective members.

3. A rotary mechanism as claimed in claim 1, in which a bearing plate is provided intermediate the intermediate gear and the eccentric.

4. A rotary mechanism as claimed in claim 3, in which the bearing plate is integral with the intermediate gear.

5. A rotary mechanism as claimed in claim 1, in which the drive shaft has a hand wheel attached thereto for rotating the drive shaft.

6. A rotary mechanism as claimed in claim 5, which includes a friction pad intermediate the hand wheel and a braking surface.

* * * * *